June 19, 1934. W. D. EGLINTON 1,963,297
FITTING OF RIMLESS EYEGLASSES, SPECTACLES, AND THE LIKE
Filed May 25, 1932
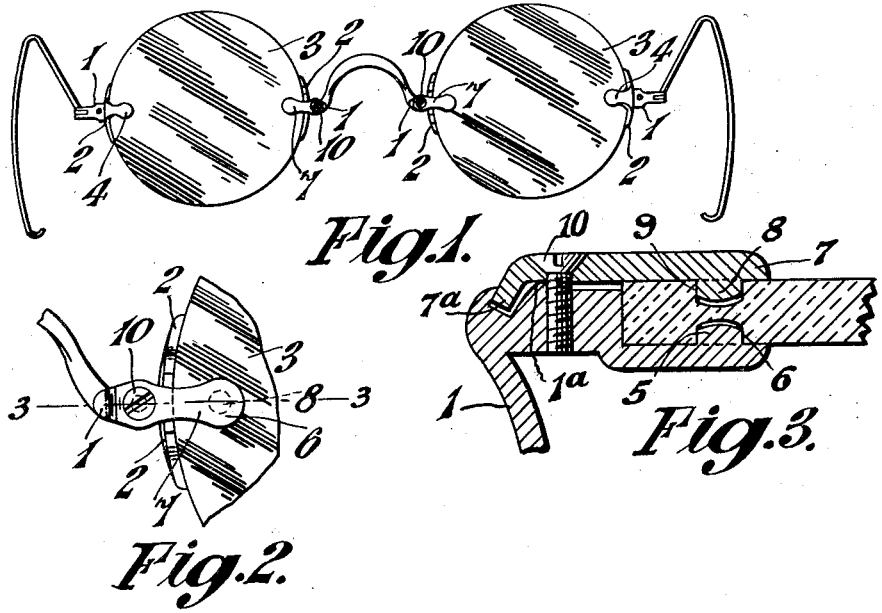
William David Eglinton
Inventor
By Ogle R. Singleton
Attorney Patented June 19, 1934

1,963,297

UNITED STATES PATENT OFFICE 1,963,297

FITTING OF RIMLESS EYEGLASSES, SPECTACLES, AND THE LIKE

William David Eglinton, Croydon, England

Application May 25, 1932, Serial No. 613,520
In Great Britain May 28, 1931

2 Claims. (Cl. 88—47)

This invention relates to the fittings of rimless eye-glasses, spectacles and the like.

Rimless spectacles and eye-glasses are popular but the fitting of the legs, bridge pieces, placquets and the like to the lenses presents difficulty. The object of my invention is to provide fittings which can be easily applied to the lenses or eye-pieces and which when in position will be securely held and at the same time capable of removal and replacement and the application of which to the lenses will not be liable to break them. The principle underlying my invention is to provide the fittings with projections adapted to engage depressions or holes provided at the correct positions in the surfaces or rims of the lenses or eye-pieces in such a way that after correct adjustment has once been effected the pressure of the projections on the lenses cannot be increased to any great extent by the user and thus breakages are obviated.

Preferably the projections on the fittings are duplicated in opposed relation and engage depressions on opposite sides of the eye-pieces or lenses.

In the accompanying drawing I have illustrated embodiments of my invention.

In this drawing Figure 1 is a front view of a pair of spectacles with fittings according to my invention; Figure 2 is a face view of one of the fittings to an enlarged scale; Figure 3 is a sectional view on line 3—3 of Figure 2.

Referring to Figures 1-3 of the drawing a member 1 is provided having a small rim portion 2 which conforms to and engages the rim or edge of the lens 3 and projecting from this rim portion 2 is a lug 4 with a small "pip" or projection 5 adapted to engage a depression or hole 6 in one face of the lens 3. I provide a second member 7 having a "pip" or small projection 8 adapted to engage a depression or hole 9 on the other face of the lens and this member is adapted to lie with its end 7a in a locating recess in the first member and to be screwed to such first member at a position just outside the edge of the lens, a drilled boss being provided to take the necessary screw 10. This second member 7 is provided on the side of the drilled boss aforesaid remote from the lens with a shaped end 7a adapted to engage in a positioning recess in the other member the arrangement being such that the screwing together of the two members will ensure an even grip upon the lens from both sides as though the one element were connected by a hinge to the other. That is to say, the member 7 rests upon a slight rise of hump 1a on the element 1 so that the screwing up of the screw 10 which passes loosely through a hole in the element 7 will secure the element 7 in its proper adjusted plane and once this is effected further tightening of the screw 10 will not cause the "pip" or projection 8 to press further into the recess in the lens with any considerable pressure reverse and any excess pressure applied by the screw 10 will be taken mainly upon the element 1 and not upon the lens owing to the position of the screw 10 relative to the hump 1a. By this arrangement not only can the edge of the lens be easily inserted between and removed from the fitment by a mere loosening of the securing screw and without any complete disconnection of the two parts but an incompetent user cannot break the lens by screwing up the screw 10 too tightly.

It will be understood that the fittings can be utilized to secure the bridge or nose piece the legs or placquets or other elements to the rimless lenses or eye-pieces.

The same general principles may be applied to somewhat analogous uses, such for example as securing the glasses of watches in position.

What I claim and desire to secure by Letters Patent is:—

1. Rimless eyeglasses comprising an element integral with the bridge or nose-piece and having a lug provided with a projection or "pip", a second element adapted to be secured to the first element by a screw said second element having a lug provided with a projection or "pip" adapted to co-operate with the lug of the first element, the second element resting upon a rise or hump on the first element into which the securing screw screws after passing loosely through a hole in the second element substantially as described with reference to the drawing.

2. Rimless eye glasses comprising a lens clamping element integral with the bridge or nose piece having a boss, a lug projecting from said boss, a "pip" projecting inwardly from said lug for engaging a recess in the lens or eye piece, a hump on said boss intermediate the bridge or nose piece, and the lug, a tapped hole in said boss, a second lens clamping element having a lug having a "pip" oppositely disposed with relation to the "pip" of the first mentioned clamping element a curved tail proceeding from said second element, a recess in the bridge into which said tail can be adjusted to varying positions a hole in said second element coinciding with the tapped hole in the boss and a screw for fixedly securing the clamping elements rigidly together after the position of said second clamping element has been adjusted.

WILLIAM DAVID EGLINTON.